United States Patent
Chien

(10) Patent No.: US 12,192,299 B2
(45) Date of Patent: Jan. 7, 2025

(54) COMMON-FRAMEWORK CONTROLLER FOR MULTIPLE DEVICE TYPES

(71) Applicant: Ruckus IP Holdings LLC, Claremont, NC (US)

(72) Inventor: Cheng-Ming Chien, Taoyuan (TW)

(73) Assignee: Ruckus IP Holdings LLC, Claremont, NC (US)

( * ) Notice: Subject to any disclaimer, the term of this patent is extended or adjusted under 35 U.S.C. 154(b) by 92 days.

(21) Appl. No.: 17/715,084

(22) Filed: Apr. 7, 2022

(65) Prior Publication Data

US 2022/0353348 A1 Nov. 3, 2022

Related U.S. Application Data

(60) Provisional application No. 63/180,689, filed on Apr. 28, 2021.

(51) Int. Cl.
| | |
|---|---|
| *G06F 15/173* | (2006.01) |
| *H04L 41/12* | (2022.01) |
| *H04L 67/02* | (2022.01) |
| *H04L 67/561* | (2022.01) |
| *H04L 67/566* | (2022.01) |

(52) U.S. Cl.
CPC ............ *H04L 67/561* (2022.05); *H04L 41/12* (2013.01); *H04L 67/02* (2013.01); *H04L 67/566* (2022.05)

(58) Field of Classification Search
None
See application file for complete search history.

(56) References Cited

U.S. PATENT DOCUMENTS

| | | | | |
|---|---|---|---|---|
| 8,195,827 | B2* | 6/2012 | Strassner | H04L 41/12 709/227 |
| 9,160,859 | B2* | 10/2015 | Tadayon | H04W 4/023 |
| 10,284,426 | B2* | 5/2019 | Meng | H04L 41/0869 |
| 2012/0016970 | A1* | 1/2012 | Shah | G06F 16/23 709/220 |
| 2012/0159490 | A1* | 6/2012 | Minov | G06F 9/44526 718/100 |

(Continued)

FOREIGN PATENT DOCUMENTS

EP 3809635 A1 * 4/2021 ......... G06F 9/45533

*Primary Examiner* — Yves Dalencourt
(74) *Attorney, Agent, or Firm* — Steven Stupp

(57) ABSTRACT

A computer system is described. This computer system may implement a controller for multiple different types of computer network devices (CNDs), such as: an access point, a switch, a router, and a dataplane. Moreover, the computer system may have a common framework for program modules (with sets of program instructions) associated with the different types of CNDs. Furthermore, configuration and management of a given type of CND using the program modules may be specified by metadata associated with the given type of CND. Additionally, the common framework may include a unified protocol layer for the program modules, and one or more of the program modules may be modified or configured via the unified protocol layer using a common communication Alternatively or additionally, the computer system may communicate with the different types of CNDs via the unified protocol layer using a second common communication protocol.

14 Claims, 11 Drawing Sheets

(56) References Cited

U.S. PATENT DOCUMENTS

| | | | |
|---|---|---|---|
| 2014/0066014 A1* | 3/2014 | Nicholson | H04W 12/088 |
| | | | 455/411 |
| 2016/0373300 A1* | 12/2016 | Liu | H04L 41/0806 |
| 2018/0013793 A1* | 1/2018 | Belamaric | H04L 63/20 |
| 2018/0234326 A1* | 8/2018 | Swierk | H04L 69/08 |
| 2021/0136120 A1* | 5/2021 | Crabtree | G06F 16/9024 |
| 2022/0353348 A1* | 11/2022 | Chien | H04L 67/02 |

* cited by examiner

COMMON-FRAMEWORK CONTROLLER FOR MULTIPLE DEVICE TYPES

CROSS REFERENCE TO RELATED APPLICATIONS

This application claims priority under 35 U.S.C. 119(e) to: U.S. Provisional Application Ser. No. 63/180,689, "Computer-Network-Device Configuration Using Data-Driven Metadata," filed on Apr. 28, 2021, by Cheng-Ming Chien, the contents of which are herein incorporated by reference.

FIELD

The described embodiments relate to techniques for configuring and managing different types of computer network devices (CNDs) using a controller having a common framework for standard program modules or sets of instructions associated with functions of the different types of CNDs.

BACKGROUND

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Washington), and/or another type of wireless network.

For example, many electronic devices communicate with each other via wireless local area networks (WLANs) using an IEEE 802.11-compatible communication protocol (which are sometimes collectively referred to as a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

However, as electronic devices become more complicated, it is often increasingly difficult to modify features or add new features. For example, changing a communication capability may involve modifications to: an electronic device (such as an access point), a local or remote controller that manages or configures the electronic device, a cloud-based computer that provides services associated with the electronic device, and/or associated data structures that are stored locally or remotely.

Moreover, while the changes or modifications to the features of an electronic device may be specified by humans, the configuration or programming of the electronic device is typically machine-readable language (such as machine code). While engineers understand the machine code, program managers and customers who specify the changes or modifications the features may not be able to understand such a low-level programming language.

Consequently, there are often architectural and communication obstacles when implementing changes or modifications to the features of an electronic device. These challenges may increase development time, and may increase the complexity and the cost of the electronic device.

Furthermore, it is typically difficult to configure and manage different types of electronic devices, such as different types of CNDs. For example, in many networks, different types of CNDs are configured and managed using separate controllers, which often use different protocols and architectures.

SUMMARY

In a first group of embodiments, a computer system (which includes one or more computers) is described. This computer system may include: an interface circuit, a memory that stores program instructions, and a processor that executes the program instructions. During operation, the computer system converts user-interface metadata associated with a configuration of a CND into a user interface that includes a hierarchical representation of the user-interface metadata. Moreover, the computer system provides, addressed to an electronic device, information that specifies the user interface. Then, the computer system receives, associated with the electronic device, user-interface activity that specifies a modification to the hierarchical representation of the user-interface metadata. Furthermore, the computer system updates the configuration based at least in part on the modification to the hierarchical representation of the user-interface metadata.

Note that the hierarchical representation of the user-interface metadata may include a natural language.

Moreover, the information may have a format that is compatible with a browser program. For example, the format may include JavaScript or Hyper Text Markup Language.

Furthermore, the computer system may provide an application programming interface (API) based at least in part on API metadata, where the API is configured to communicate data between the CND and one or more of: a controller configured to configure and manage the CND, or a second computer system (which may includes one or more computers) that provides a service associated with the CND.

Additionally, the computer system may provide a storage API based at least in part on storage metadata, where the storage API is configured to communicate second data between the CND and a computer-readable memory configured to store the second data. This second data may be used by the user interface and/or the API. Note that the storage API may be compatible with a Protocol Buffer.

In some embodiments, the computer system may translate configuration metadata corresponding to the configuration of the CND into configuration code (such as machine code or machine language). Then, the computer system may provide, addressed to the CND, the configuration code. This configuration code may have a flat representation. Alternatively or additionally, the configuration code may have a domain-specific format associated with the CND. Note that the configuration code may be compatible with a Protocol Buffer.

Moreover, the CND may include: an access point, a switch, or a router.

Furthermore, one or more of the user-interface metadata, the API metadata, the storage metadata, or the configuration metadata may be stateless.

Additionally, updating the configuration may involve validating the modification to the hierarchical representation of the user-interface metadata.

Another embodiment provides a computer in the computer system.

Another embodiment provides a user interface that includes a hierarchical representation of user-interface metadata.

Another embodiment provides a computer-readable storage medium for use with the computer or the computer system. When executed by the computer or the computer system, this computer-readable storage medium causes the computer or the computer system to perform at least some of the aforementioned operations.

Another embodiment provides a method, which may be performed by the computer or the computer system. This method includes at least some of the aforementioned operations.

In a second group of embodiments, a computer system (which includes one or more computers) that implements a controller for multiple different types of CNDs is described. This computer system may include: an interface circuit, a memory that stores program instructions, and a processor that executes the program instructions. Moreover, the computer system has a common framework for program modules (with sets of program instructions) associated with the different types of CNDs. Furthermore, configuration and/or management of a given type of CND using the program modules is specified by metadata associated with the given type of CND.

Note that the types of CNDs may include: an access point, a switch, a router, and a dataplane.

Moreover, the common framework may include a unified protocol layer for the program modules. For example, one or more of the program modules may be modified or configured via the unified protocol layer using a common communication protocol, such as a HyperText Transfer Protocol Secure (HTTPS) communication protocol. Furthermore, the computer system may receive a modification or a configuration, associated with a second computer, for one or more of the program modules associated with the different types of CNDs via a common access port.

Alternatively or additionally, the computer system may communicate with the different types of CNDs via the unified protocol layer using a second common communication protocol, such as an HTTPS communication protocol. In some embodiments the computer system may communicate with the different types of CNDs via a second common access port.

Additionally, a given program module may be associated with one or more device-specific functions of at least a given type of CND.

In some embodiments, a user interface, an API, storage, and/or a configuration of the given type of CND associated with at least a subset of the program modules may be specified by metadata associated with the given type of CND.

Another embodiment provides a computer in the computer system.

Another embodiment provides a computer-readable storage medium for use with the computer or the computer system. When executed by the computer or the computer system, this computer-readable storage medium causes the computer or the computer system to perform at least some of the aforementioned operations.

Another embodiment provides a method, which may be performed by the computer or the computer system. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
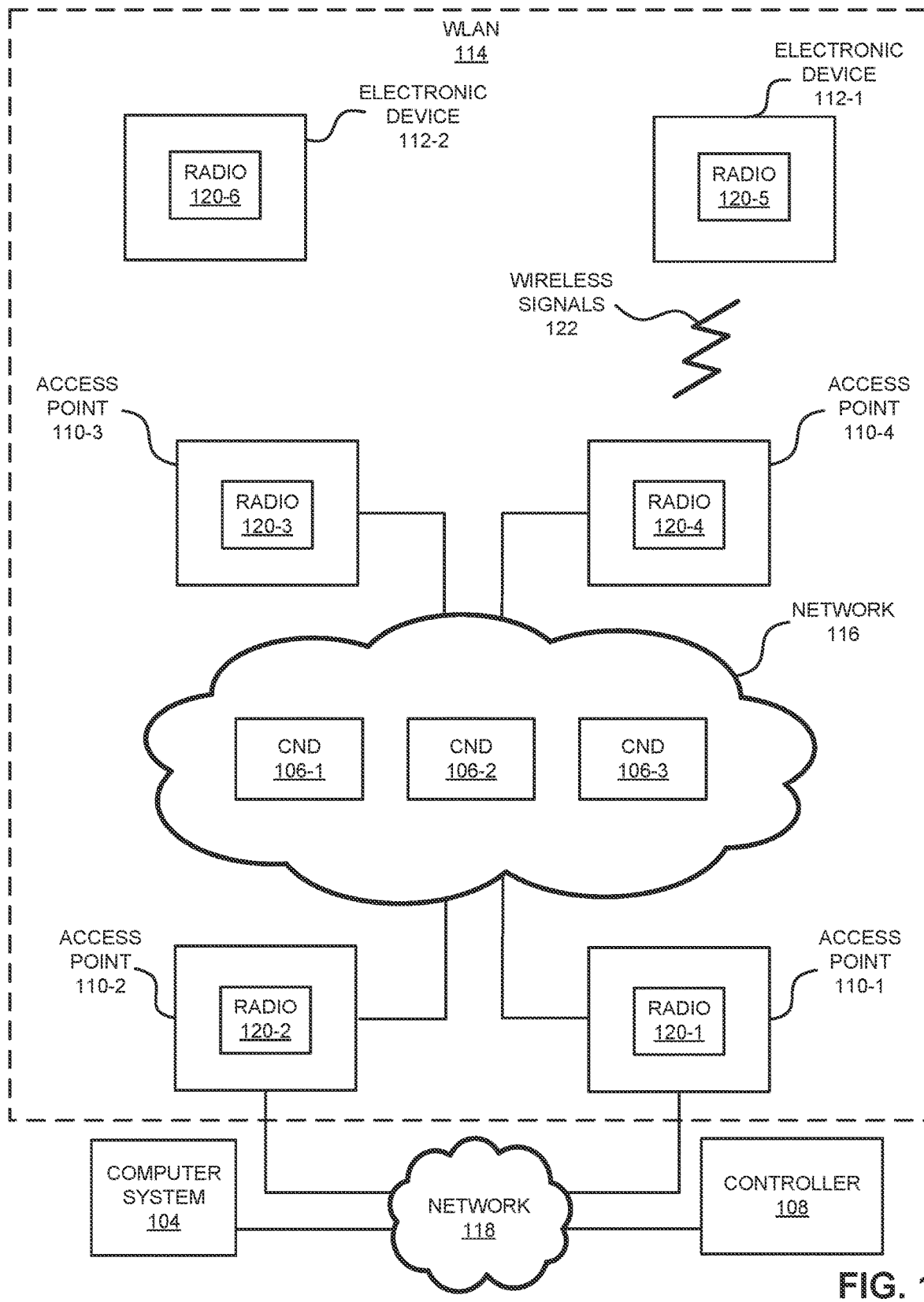
FIG. 1 is a block diagram illustrating an example of communication among electronic devices and computer network devices (CNDs) in a network in accordance with an embodiment of the present disclosure.

In a first group of embodiments, a computer system (which may include one or more computers) is described. During operation, the computer system may convert user-interface metadata associated with a configuration of a CND into a user interface that includes a hierarchical representation of the user-interface metadata. Moreover, the computer system may provide, addressed to an electronic device, information that specifies the user interface. Then, the computer system may receive, associated with the electronic device, user-interface activity that specifies a modification to the hierarchical representation of the user-interface metadata. Furthermore, the computer system may update the configuration based at least in part on the modification to the hierarchical representation of the user-interface metadata. Note that the hierarchical representation of the user-interface metadata may include a natural language. Furthermore, the information may have a format that is compatible with a browser program. For example, the format may include JavaScript or Hyper Text Markup Language.

By providing the information specifying the user interface and updating the configuration, these configuration techniques may facilitate modifying or adding features to the CND. For example, the user interface may allow a non-technical user to provide the modification to the hierarchical representation of the user-interface metadata. Notably, the hierarchical representation of the user-interface metadata may be human-readable. Moreover, the user-interface metadata may be used to update configuration metadata, which may be used to generate configuration code for the CND that has a flat representation (such as machine code or machine language) and that has a domain-specific format associated with the CND. Consequently, the configuration techniques may remove architectural and communication obstacles or difficulties to changing or modifying the features of the CND. These capabilities may decrease development time, and may simplify the CND (such as software for the CND) and reduce the cost of the CND.

In a second group of embodiments, a computer system (which includes one or more computers) is described. This computer system may implement a controller for multiple different types of CNDs, such as: an access point, a switch, a router, and a dataplane. Moreover, the computer system may have a common framework for program modules (with sets of program instructions) associated with the different types of CNDs. Furthermore, configuration and/or management of a given type of CND using the program modules may be specified by metadata associated with the given type of CND. Additionally, the common framework may include a unified protocol layer for the program modules, and one or more of the program modules may be modified or configured via the unified protocol layer using a common communication protocol, such as an HTTPS communication protocol. Alternatively or additionally, the computer system may communicate with the different types of CNDs via the unified protocol layer using a second common communication protocol, such as the HTTPS communication protocol.

By providing the common framework, these configuration and/or management techniques may facilitate simpler and unified configuration and/or management of the different types of CNDs using a single controller. Moreover, the configuration and/or management techniques may simplify and reduce the expense of networks that include the different types of CNDs. Consequently, the configuration and/or management techniques may remove architectural and communication obstacles or difficulties associated with configuring and managing the different types of CNDs. These capabilities may decrease development time, may simplify the different types of CNDs (such as software for a given type of CND), may reduce the cost of the different types of CNDs, may simplify the computer system, and/or may reduce the cost of the computer system.

In the discussion that follows, electronic devices (such as an access point or an eNodeB) communicate frames or packets with another electronic device (such as a recipient electronic device, which is sometimes referred to as a 'client') in accordance with one or more wireless communication protocol, such as an IEEE 802.11 standard (which is sometimes referred to as 'Wi-Fi,' from the Wi-Fi Alliance of Austin, Texas), Bluetooth (from the Bluetooth Special Interest Group of Kirkland, Washington), BLE (from the Bluetooth Special Interest Group of Kirkland, Washington), Zigbee (from the Zigbee Alliance of Davis, California), Z-Wave (from Sigma Designs, Inc. of Fremont, California), LoRaWAN (from the Lora Alliance of Beaverton, Oregon), Thread (from the Thread Group of San Ramon, California), IPv6 over low-power wireless personal area networks or 6LoWPAN (from the Internet Engineering Taskforce of Fremont, California) and/or another type of wireless interface. In the discussion that follows, Wi-Fi is used as an illustrative example. Note that an IEEE 802.11 standard may include one or more of IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies.

However, a wide variety of communication protocols (such as Long Term Evolution or LIE, another cellular-telephone communication protocol, etc.) may be used. The wireless communication may occur in one or more bands of frequencies, such as: a 900 MHz, a 2.4 GHz, a 5 GHz, 6 GHz, the Citizens Broadband Radio Spectrum or CBRS (e.g., a frequency band near 3.5 GHz), a band of frequencies used by LTE or another cellular-telephone communication protocol or a data communication protocol, and/or a 60 GHz frequency band. (Note that IEEE 802.11 ad communication over a 60 GHz frequency band is sometimes referred to as 'WiGig.' In the present discussion, these embodiments also encompassed by 'Wi-Fi.') In some embodiments, communication between electronic devices may use multi-user transmission (such as orthogonal frequency division multiple access or OFDMA).

Moreover, the access point or eNodeB may communicate with other access points, eNodeBs, CNDs (such as a router or a switch), computers and/or computer systems in a network using a wired communication protocol, such as an IEEE 802.3 standard (which is sometimes referred to as 'Ethernet'), Message Queueing Telemetry Transport (MQTT) and/or another type of wired interface. In the discussion that follows, Ethernet is used as an illustrative example.

FIG. 1 presents a block diagram illustrating an example of communication among one or more access points (APs) 110 and electronic devices 112 (such as a cellular telephone, and which are sometimes referred to as 'stations' or 'clients') in a WLAN 114 (which is used as an example of a wireless network) in accordance with some embodiments. APs 110 may communicate with each other in WLAN 114 using wireless and/or wired communication (such as by using Ethernet or a communication protocol that is compatible with Ethernet). Note that APS 110 may include a physical AP and/or a virtual AP that is implemented in software in an environment of an electronic device or a computer. In addition, at least some of APs 110 (such as APs 110-3 and 110-4) may communicate with electronic devices 112 using wireless communication.

The wired and/or wireless communication among APs 110 in WLAN 114 may occur via network 116 (such as an intra-net, a mesh network, point-to-point connections and/or the Internet) and may use a network communication protocol, such as Ethernet. For example, WLAN 114 may include CND 106 (e.g., a switch or a router). In some embodiments, the one or more CNDs 106 may include a stack of multiple CNDs (which are sometimes referred to as 'stacking units').

Furthermore, the wireless communication using Wi-Fi may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, the wired and/or wireless communication among APs 110 also involves the use of dedicated connections, such as via a peer-to-peer (P2P) communication technique. Therefore, APs 110 may support wired communication outside of WLAN 114 (such as Ethernet) and wireless communication within WLAN 114 (such as Wi-Fi), and one or more of APs 110 may also support a wired communication protocol for communicating via network 118 with electronic devices (such as computer system 104 or a controller 108, e.g., of WLAN 114, which may be local or remotely located from WEAN 114). Note that controller 108 may configure or provision the one or more CNDs 106 and/or APs 110. In some embodiments, controller 108 may be implemented by a computer system that includes one or more computers.

Figure 8:
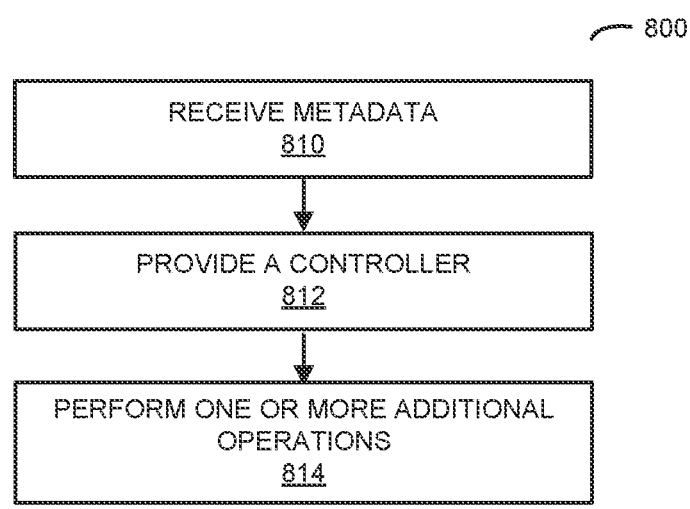
FIG. 8 is a flow diagram illustrating an example of a method for providing a controller for multiple different types of CNDs using a computer system in FIG. 1 in accordance with an embodiment of the present disclosure.

As described further below with reference to FIG. 8, the one or more CNDs 106, APs 110, electronic devices 112, controller 108 and/or computer system 104 may include subsystems, such as a networking subsystem, a memory subsystem and a processor subsystem. In addition, APs 110 and electronic devices 112 may include radios 120 in the networking subsystems. More generally, APs 110 and electronic devices 112 can include (or can be included within) any electronic devices with the networking subsystems that enable APs 110 and electronic devices 11 to communicate with each other using wireless and/or wired communication. This wireless communication can include transmitting advertisements on wireless channels to enable APs 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in APs 110 and electronic devices 112, one or more of these instances may be different from the other instances of radios 120.

As can be seen in FIG. 1, wireless signals 122 (represented by a jagged line) are transmitted from radio 120-4 in AP 110-4. These wireless signals may be received by radio 120-5 in electronic device 112-1. Notably, AP 110-4 may transmit packets or frames. In turn, these packets or frames may be received by electronic device 112-1. Moreover, AP 110-4 may allow electronic device 112-1 to communicate with other electronic devices, computer system 104, CNDs 106, controller 108, computers and/or servers via networks 116 and/or 118.

Note that the communication among APs 110 and/or with electronic devices 112 (and, more generally, communication among components in WLAN 114) may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in CNDs 106, APs 110 and/or electronic devices 112 includes: receiving signals (such as wireless signals 122) corresponding to the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, it can be difficult to change or modify features of APs 110 or CNDs 106. Consequently, the resulting software or program instructions may be complicated and expensive, and may take a long-time to develop.

In order to address these problems, as described further below with reference to FIGS. 2-7, the disclosed configuration techniques may allow a user (such as an operator of a network, such as WLAN 114, or a customer) to use a computer system (such as computer system 104) to dynamically update data-driven metadata that is used to configure one or more of APs 110 or one or more of CNDs 106.

Notably, computer system 104 may convert user-interface metadata, which is stored in local and/or remote memory, and which is associated with a configuration of a CND (such as one of CNDs 106 or one of APs 110), into a user interface that includes a hierarchical representation of the user-interface metadata. Moreover, computer system 104 may provide, to an electronic device (such as a computer, not shown) that is used by a user, operator or a customer, information that specifies the user interface. This user, operator or customer may interact with a human-interface device in or associated with the electronic device (such as a keyboard, a mouse, a trackpad, a touch pad, a touch-sensitive display, a voice interface, etc.) to provide user-interface activity that specifies a modification to the hierarchical representation of the user-interface metadata. Then, the electronic device may provide information specifying the user-interface activity to computer system 104. After receiving the information, computer system 104 may update the configuration (e.g., by updating the user-interface metadata) based at least in part on the modification to the hierarchical representation of the user-interface metadata, and may store the updated configuration in the memory.

Moreover, computer system 104 may provide an API based at least in part on API metadata that is stored in the memory. This API may communicate data between the CND and one or more of: a local or a remote (e.g., cloud-based) controller (such as controller 108) that configures and manages the CND, and/or a second computer system (such as computer system 104 or another computer system that is not shown in FIG. 1) that provides a service associated with the CND (e.g., an analytics service).

Furthermore, computer system 104 may provide a storage API based at least in part on storage metadata that is stored in the memory. This storage API may communicate second data (which may be the same as or different from the data) between the CND and local and or remote memory that stores the second data.

Additionally, computer system 104 may translate configuration metadata, which is stored in the memory, and which corresponds to the configuration of the CND, into configuration code (such as machine code or machine language). Note that configuration metadata may be based at least in part on the user-interface metadata. Then, computer system 104 may provide, to the CND, the configuration code in order to update the configuration of the CND (such as to add or modify one or more features associated with the CND).

In some embodiments, the updated user-interface metadata is used by computer system 104 to update one or more other types of metadata (such as the API metadata, the storage metadata and/or the configuration metadata), so that the user, the operator or the customer can use the high-level user interface to specify configuration charges that are seamlessly implemented by computer system 104.

In these ways, the configuration techniques may allow non-technical users, operators or customers to interact with the user interface to modify the user-interface metadata. For example, the hierarchical representation of the user-interface metadata may express or represent the user-interface metadata in a natural language (such as English). Moreover, the computer system may be able to use the configuration metadata to generate the configuration code to configure the CND. Note that the configuration code may have a flat representation and/or a domain-specific representation corresponding to the CND. While the configuration code may be understandable to a technical user (such as an engineer), it may be difficult for a non-technical user to understand. Thus, the configuration techniques may provide a flexible and dynamic conversion process, so that the user, the operator or the customer can readily update the configuration without understanding the configuration code that is used to configure the CND. In addition, the data-drive metadata that is used to create the user interface, the API, the storage API and/or the configuration code may be stateless. These capabilities may remove architectural and communication obstacles or difficulties to changing or modifying the features of the CND. Consequently, the configuration techniques may decrease development time, and may simplify the CND (such as software for the CND) and reduce the cost of the CND.

Moreover, as discussed previously, it is typically difficult to configure and manage different types of electronic devices, such as different types of CNDs. Notably, in many networks, different types of CNDs are configured and managed using separate controllers, which often use different protocols and architectures.

As discussed further below with reference to FIGS. 8-10, in order to address these challenges a computer system (such as computer system 104 or a computer system with one or more computers that implements controller 108) may perform the configuration and/or management techniques. For example, a computer (not shown) associated with a network administrator may provide metadata to controller 108, where the metadata is associated with different types of CNDs (such as CNDs 106, access points 110, one or more dataplanes, one or more switches or routers, etc.). Moreover, configuration and/or management of a given type of CND by controller 108 may use program modules (such as sets of instructions associated with different functions of the different types of CNDs) and may be specified by a subset of the metadata associated with the given type of CND. For example, the subset of the metadata may be associated with: an API, a storage API, storage, and/or configuration code for one of the CNDs. In some embodiments, the program modules may include standardized program modules that provide or that are associated with particular functions for the different types of CNDs. Thus, a given program module may be associated with one or more device-specific functions of at least a given type of CND (such as access points 110).

After receiving the metadata, controller 108 may implement the functions of a controller for the different types of CNDs based at least in part on the program modules and the metadata, where providing the functions of a controller may include using a common framework in controller 108 for the program modules. Notably, controller 108 may provide instructions to one of the CNDs (such as access point 110-4) to configure and/or manage access point 110-4. For example, the metadata may include configuration metadata, and controller 108 may translate the configuration metadata into configuration code, which is then provided to access point 110-4.

Note that the common framework may include a unified protocol layer for the program modules. This may allow the network administrator to provide (from their computer) instructions to controller 108 that specifying one or more modifications or configuration changes for one or more of the program modules associated with one or more of the CNDs via the unified protocol layer using a common communication protocol for the different types of CNDs (such as an HTTPS communication protocol). For example, the instructions may modify or change the subset of metadata 914. Furthermore, controller 108 may receive the instructions (and/or the metadata) via a common access port for the different types of CNDs. Thus, one access port may be used to provide the subset of the metadata, the metadata and/or the instructions for modifying or changing the configuration for some or all of the different types of CNDs.

Alternatively or additionally, controller 108 may communicate with the different types of CNDs via the unified protocol layer using a second common communication protocol for the different types of CNDs (such as an HTTPS communication protocol). In some embodiments, controller 108 may communicate with the different CNDs using a second common access port.

In these ways, the configuration and/or management techniques may facilitate simpler and unified configuration and/or management of the different types of CNDs using a single controller (such as controller 108). Moreover, the configuration and/or management techniques may simplify and reduce the expense of networks that include the different types of CNDs. Consequently, the configuration and/or management techniques may remove architectural and communication obstacles or difficulties associated with configuring and managing the different types of CNDs. These capabilities may decrease development time, may simplify the different types of CNDs, may reduce the cost of the different types of CNDs, may simplify controller 108, and/or may reduce the cost of controller 108.

While the preceding discussion illustrated the configuration techniques and/or the configuration and/or management techniques using a cloud-based computer system 104 and a cloud-based controller 108, in other embodiments at least some of the functions of computer system 104 and/or controller 108 are implemented locally or in proximity to a network (such as a WLAN). Thus, in some embodiments, the configuration techniques and/or the configuration and/or management techniques may be implemented in a distributed and/or a centralized manner.

Figure 2:
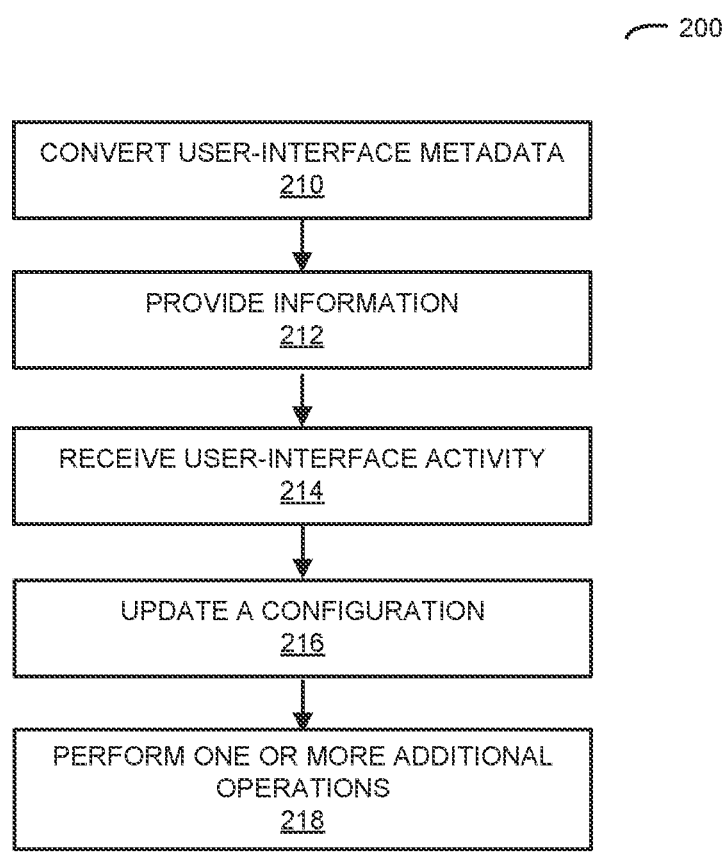
FIG. 2 is a flow diagram illustrating an example of a method for updating a configuration using a computer system in FIG. 1 in accordance with an embodiment of the present disclosure.

We now describe embodiments of a method in the first group of embodiments. FIG. 2 presents a flow diagram illustrating an example of a method 200 for updating a configuration using a computer system (such as computer system 104 or controller 108 in FIG. 1). During operation, the computer system may convert the user-interface metadata (operation 210) associated with the configuration of a CND into a user interface that includes a hierarchical representation of the user-interface metadata. Note that the hierarchical representation of the user-interface metadata may include a natural language.

Moreover, the computer system may provide, to an electronic device, information (operation 212) that specifies the user interface. Moreover, the information may have a format that is compatible with a browser program. For example, the format may include JavaScript or Hyper Text Markup Language.

Then, the computer system may receive, from the electronic device, user-interface activity (operation 214) that specifies a modification to the hierarchical representation of the user-interface metadata. Furthermore, the computer system may update the configuration (operation 216) based at least in part on the modification to the hierarchical representation of the user-interface metadata.

In some embodiments, the computer system may optionally perform one or more additional operations (operation 218). Notably, the computer system may provide an API based at least in part on API metadata, where the API communicates data between the CND and one or more of: a controller that configures and manages the CND, or a second computer system that provides a service associated with the CND.

Moreover, the computer system may provide a storage API based at least in part on storage metadata, where the storage API communicates second data between the CND and a computer-readable memory that stores the second data. This second data may be used by the user interface and/or the API. Note that the storage API may be compatible with a Protocol Buffer (from Google, Inc. or Mountain View, California). In the present discussion, a 'Protocol Buffer' may include a technique for serializing structured data, which allows communication of data over a network or for storing data. A Protocol Buffer may use an interface description language that describes the structure of some data and a program that generates source code from that description for generating or parsing a stream of data that represents the structured data.

Furthermore, the computer system may translate configuration metadata corresponding to the configuration of the CND into configuration code (such as machine code or machine language). In some embodiments, the configuration metadata is based at least in part on the user-interface metadata. Then, the computer system may provide, to the CND, the configuration code. This configuration code may have a flat representation. Alternatively or additionally, the configuration code may have a domain-specific format associated with the CND. Note that the configuration code may be compatible with a Protocol Buffer.

Note that the CND may include: an access point, a switch, or a router.

Moreover, one or more of the user-interface metadata, the API metadata, the storage metadata, and/or the configuration metadata may be stateless.

Furthermore, updating the configuration may involve validating the modification to the hierarchical representation of the user-interface metadata.

In some embodiments of method 200, there may be additional or fewer operations. Furthermore, the order of the operations may be changed, and/or two or more operations may be combined into a single operation.

Figure 3:
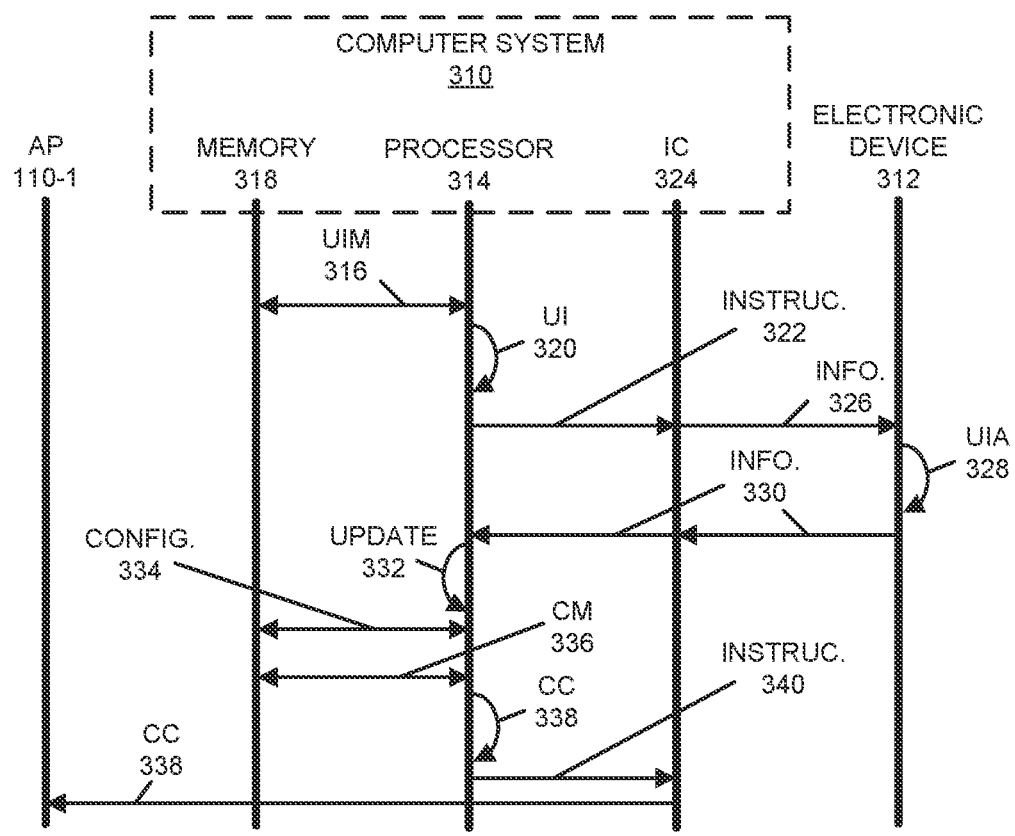
FIG. 3 is a drawing illustrating an example of communication between components in a computer system in FIG. 1 in accordance with an embodiment of the present disclosure.

FIG. 3 presents a drawing illustrating an example of communication between computer system 310, electronic device 312 and AP 110-1. Notably, processor 314 in computer system 310 may access user-interface metadata (UIM) 316, which is associated with a configuration of AP 110-1, in memory 318 in computer system 310. Then, processor 314 may convert the user-interface metadata 316 into a user interface (UI) 320 that includes a hierarchical representation of the user-interface metadata.

Moreover, processor 314 may instruct 322 interface circuit (IC) 324 in computer system 310 to provide, to electronic device 312, information 326 that specifies user interface 320. After receiving information 326, electronic device 312 may present user interface 320 on a display. Furthermore, a user of electronic device 312 may interact with user interface 320 to provide user-interface activity or UIA 328 (such as interactions with a human-interface device, e.g., a touch-sensitive display, a voice interface, etc.). This user-interface activity may specify a modification to the hierarchical representation of the user-interface metadata and, thus, to the configuration. Next, electronic device 312 may provide, to computer system 310, information 330 specifying modification 330.

After receiving information 330, interface circuit 324 may provide information 330 to processor 314. In response, processor 324 may update 332 the configuration (such as by updating the user-interface metadata 316) based at least in part on the modification, and may store the updated configuration 334 in memory 318.

While FIG. 3 illustrates the use of data-driven generation of user interface 320, in other embodiments processor 314 may use additional metadata in memory 318 to determine or generate: an API, a storage API, and/or configuration code (CC) 338 for AP 110-1. For example, processor 310 may access, in memory 318, configuration metadata (CM) 336. Then, processor 314 may translate configuration metadata 336 into configuration code 338. Moreover, processor 314 may instruct 340 interface circuit 324 to provide configuration code 338 to AP 110-1.

Furthermore, while FIG. 3 illustrates communication between components using unidirectional or bidirectional communication with lines having single arrows or double arrows, in general the communication in a given operation in these figures may involve unidirectional or bidirectional communication.

We now further describe the configuration techniques. During feature development, the major tasks may include: a persistent layer, a logic layer, and a presentation layer. For example, a user may use a user interface to provide values for a network configuration. Then, a controller may translate this human-readable configuration for the AP. In the configuration techniques, 'data-driven' programming is used to improve the development velocity and to reduce code complexity. Notably, metadata files are defined for data modeling, domain modeling, view modeling, and to provide domain-specific language for data-processing logic. A data-processing engine in a computer or a computer system for each of the aforementioned layers may use the metadata files to control the program flow (instead of hard coding the program). These capabilities may allow a wide variety of individuals, who may have different backgrounds or skills from dedicated developers, to be able to specify a network feature for a controller by editing metadata files. In the present discussion, note that 'metadata' may include data that describes or gives information about other data. Thus, metadata may define or specify a configuration.

In some embodiments, features may include: an external service (such as single sign on, role-based access control, external databases, etc.), a flow associated with a cloud-based service (such as AP pre-provisioning, a control-plane service, e.g., a subscriber portal, a guest portal, dynamic pre-shared keys, authentication authorization and accounting, etc.), a storage capability, a communication capability, and/or another types of feature.

A data-drive architecture may allow logic and data to be separated or extracted from program code. This approach may unify a coding style across feature development, may allow faster development cycles, and may facilitate better communication within development teams using well-defined data. In data-driven programming, code is distinguished from the data structures on which it acts, and designs both so that changes can be made to the logic of a program by editing the code instead of the data structure. In contrast with object-oriented programming, in data-driven programming the data may not merely be the state of some object. Instead, it may define the control flow of the program. Where the primary concern in object-oriented programming is encapsulation, the primary concern in data-driven programming may be writing as little fixed code as possible.

In existing feature development, an engineer may need to specify a configuration, statistics, events. Notably, the configuration may include: a user interface, an API, storage and a generator for all subsystems. Moreover, statistics may include data collection, storage, a query/aggregation API, and a user-interface chart for an administrator and for an exporter to an external system. Furthermore, an event may include: a code definition, an alarm trigger and a common event processor. In the configuration techniques, these development activities are implemented in a data-driven architecture. Therefore, application behavior can be driven by the data rather than the code. In addition, the specific data may be updated at runtime to make feature pluggable. These capabilities may allow a customer to get the latest features without upgrading their entire systems.

In some embodiments, the features may be data driven based at least in part on AP statistics. Notably, many external systems use the statistics generated by APs. However, different systems may need the APs to support different data types and may need a controller to route the statistics through different protocols to external systems. In existing development approaches, there may be a lot of code logic associated with customer requirements that is included in the APs and the controller. In the configuration techniques, a data-driven architecture is used to keep the logic defined by the data.

In general, there are a variety of consumers (such as the controller, the user interface, cloud-based analytics services, customer systems, etc.) that are interested in different statistics. An AP may provide a publisher/subscriber model for the consumers, who are subscribers. This approach may allow a consumer to subscribe interesting data with an arbitrary interval periodically or continuously. Thus, an AP may generate a statistics report based at least in part on the metadata defined by the consumers.

Table 1 provides an example of a client report based at least in part on statistics metadata. In general, there may be many message types provided by an AP based on data-driven metadata.

TABLE 1

```
message APReportBinClient {
    required string ap = 1;
    optional uint64 time = 2;
    optional uint64 binStartTime = 3;
    optional string clientMac = 8;
    optional string ssid = 10;
    optional string username = 11;
```

TABLE 1-continued

```
    optional string clientIP = 12;
    optional int32 channel = 16;
    optional uint64 rxBytes__r = 28;
    optional uint64 txBytes__r = 29;
    optional uint64 rxFrames__r = 30;
    optional uint64 txFrames__r = 31;
    optional string sessionId = 37;
    optional string multiSessionId = 38;
    optional uint64 rxBytes = 52;
    optional uint64 txBytes = 53;
    optional uint64 rxRatebps = 54;
}
```

Moreover, Table 2 provides an example of subscriber metadata. Notably, there may be two types of subscribers: on-demand, and routine. For example, a customer can monitor user-equipment traffic in real time through a user interface. The values of subscriber metadata may be filled in by a Web application and pushed to an AP. Then, the AP may generate data for this new subscription. In some embodiments, the data streaming may stop after a time interval (such as 10 min.) if the user interface does not renew the subscription.

TABLE 2

```
<subscribe>
    <stats-subscribe subscriber="SCI">
    <VAP Subscription Attributes >
    <Channel MI=90 AI=900 RI=900 chunkSize=verbose1...>
    </stats-subscribe >
    <stats-subscribe subscriber="UI">
    <Client MI=60 AI=120 RI=120 chunkSize=simple ... >
    <Channel MI=60 AI=60 RI=60 chunkSize=simple...>
    </ stats-subscribe >
    ...
</subscribe>
```

A challenge on the controller for data-driven statistics is that controller may also need to process a message in a data-driven manner. The controller may need to have infrastructure changes for scalability and flexibility. Notably, the controller may need to be statelessness for statistics. For example, the regular report interval may be decreased, e.g., from 15 min. to 90 or 180 s. The controller may apply statelessness in order to handle several times the amount of data. Moreover, an AP may keep its own state and may provide necessary state information in messages. Therefore, the controller may not need to perform a look up in a data structure or a database for the data processing. In this way, the controller may prevent read-before-write operation physically for better performance.

Figure 4:
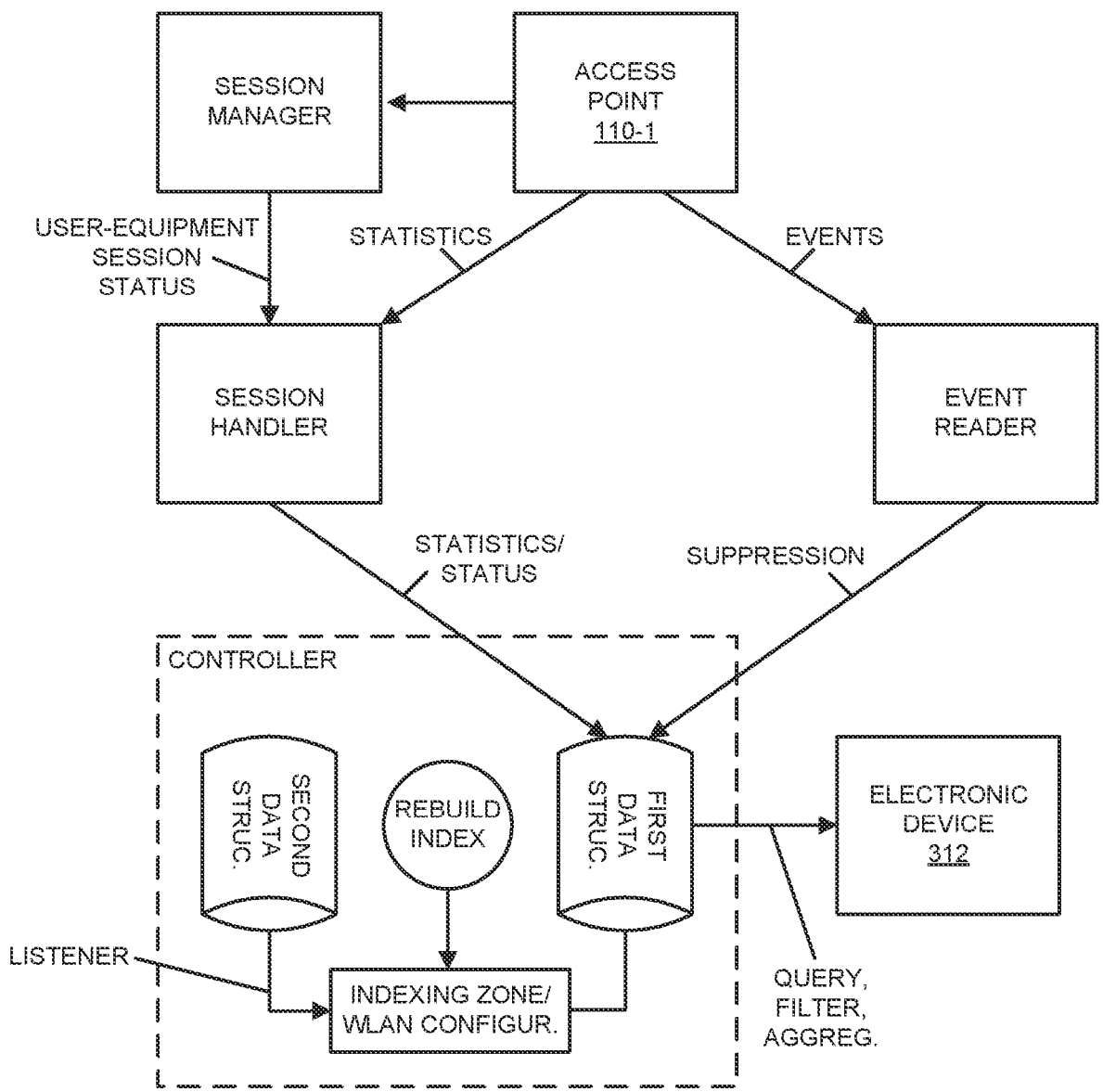
FIG. 4 is a drawing illustrating an example of data reports using data-driven metadata in accordance with an embodiment of the present disclosure.

Furthermore, the controller may use common query responsibility segregation (CQRS) for streaming data and microservices, and seamless data synchronization. FIG. 4 presents a drawing illustrating an example of data reports using data-driven metadata in accordance with an embodiment of the present disclosure. For the data reported by an AP, the controller may store them to a first data structure directly. Moreover, for the configuration (command), the controller may store to a second data structure, then may synchronize to the first data structure. In this example, there may be one listener monitoring the data change event. This listener may synchronize data seamlessly in real-time. Furthermore, the listener may be a library, so that another process for data synchronization does not need to be created. The benefit of this approach is that the data will not be read again from the source. This may reduce read operations. In some embodiments, query and aggregation results may be provided by the first data structure for improved performance and a better user experience.

In the communication techniques, there may be a storage API with a dynamic table schema and a universal query. Notably, for data-driven metadata on AP statistics, the controller may provide a storage API, with create, read, update and delete (CRUD) and query capabilities based at least in part on the properties specified by the metadata. Table 3 provides an example of defining a table schema using metadata. In this way, a client may define its own metadata for data storage. The storage API may process data according to the metadata.

TABLE 3

```
message APReport {
  option (com.company.controller.protobuf.storage.category) =
  STATISTIC;
  required string id = 1 [(com.company.controller.protobuf.storage.id) =
  true];
  optional string name = 2;
  optional string zoneId = 3;
  optional string ipMode = 4;
}
```

Figure 5:
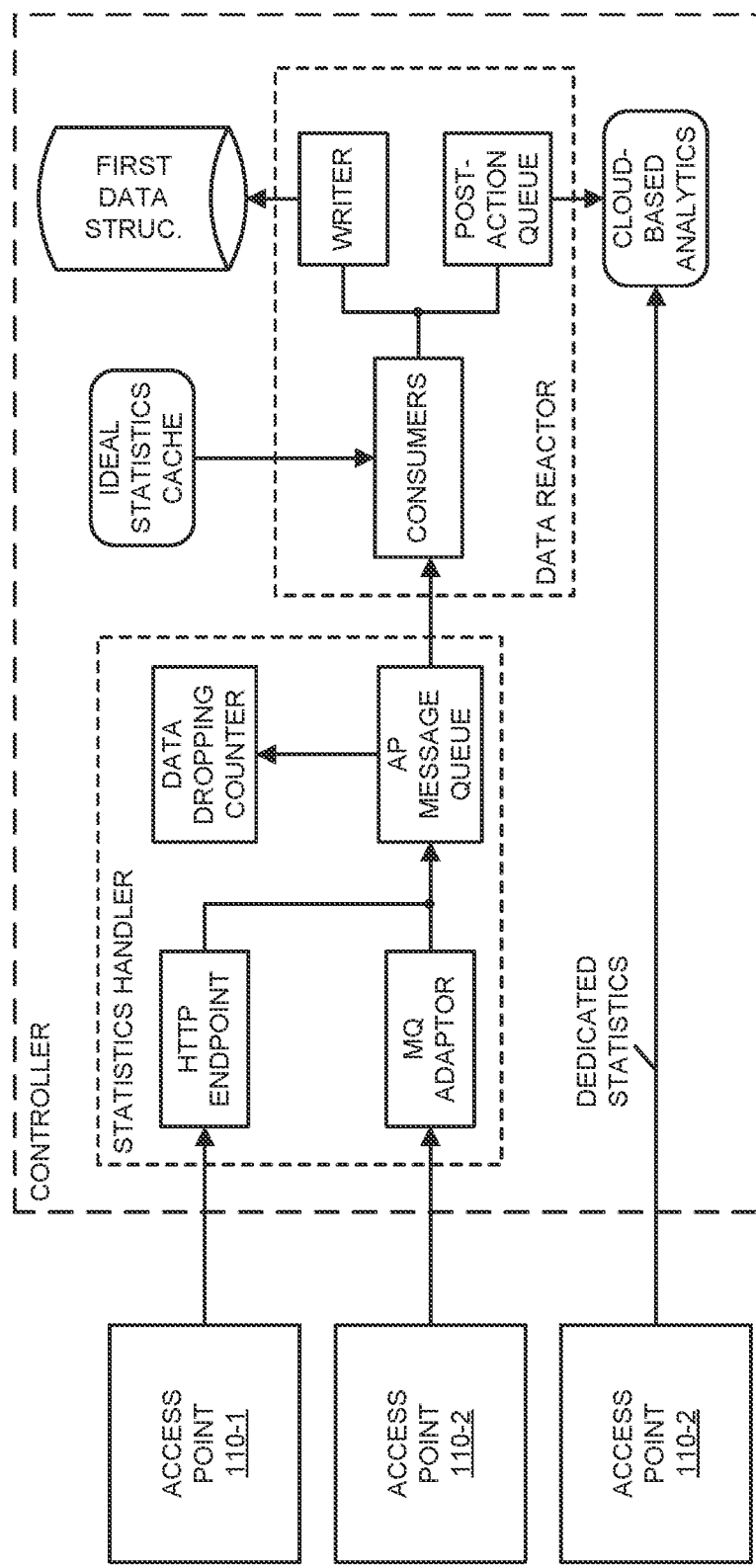
FIG. 5 is a drawing illustrating an example of a controller in accordance with an embodiment of the present disclosure.

FIG. 5 presents a drawing illustrating an example of a controller in accordance with an embodiment of the present disclosure. Because the controller may have various data sources, destinations and protocols, applying enterprise it may be necessary to have integration patterns to compose different dataflow. Moreover, having a general abstraction layer may help the controller replace or interconnect individual components. The controller may also apply reactor programming to increase computing parallelization, reduce threads and increase throughput.

In the configuration techniques, the configuration of a CND may also be data driven. Notably, as discussed previously, for each feature development, the tasks for configuration may include: a persistence layer, a logic layer, and a presentation layer. A user may use a user interface to enter the values for a network configuration. Then, the computer system or the controller may translate the human-readable configuration for the AP. A data-driven configuration may improve the development velocity and may reduce code complexity. In this approach, metadata files may be defined for data modeling, domain modeling, view modeling, and to provide domain-specific language for data-processing logic. Note that a data-processing engine in the computer system or the controller for each layer may use metadata to control the program flow (instead of hard coding the program). Table 4 presents user-interface metadata (e.g., layout, components, an API such as the API specified by the API metadata, etc.). Moreover, Table 5 presents API metadata (e.g., attribute definitions, data types, data validation, data interrelationships, etc.). Table 6 presents storage API metadata. Furthermore, Table 7 presents configuration metadata.

TABLE 4

```
<config name="wlan">
  <layout>
    <type>simpleGridLayout</type>
    <titleArea>label</titleArea>
    <treeArea>groupTree</treeArea>
    <tableArea>
      <componentType>grid</componentType>
      <actionArea>create,update,delete</actionArea>
    </tableArea>
    <previewArea>previewPane</previewArea>
  </layout>
```

TABLE 4-continued

```
  <component>
    <textfield displayText="Wlan" minLength="1" maxLength="10"
    mapTo="name"/>
    <combobox displayText="Zone" minLength"1" maxLength="10"
    mapTo="zoneId">
      <dataSource uri="/zone" labe="name" value="id"/>
    </combobox>
    <combobox displayText="IP Mode" mapTo="ipMode">
      <combobox-item label="IPV4" value="ipv4"/>
      <combobox-item label="IPV6" value="ipv6"/>
      <combobox-item label="DUAL" value="dual"/>
    </combobox>
  </component>
</api>
  <uri>/wlan/{id}</uri>
  <method>GET,POST,PUT,DELETE</method>
  <resource type="JSON">
    <property name="name" validator="Size(1,10)"/>
    <property name="zoneId" validator="NotNull"/>
    <property name="ipMode" validator="NotNull"/>
  </resource>
</api>
</config>
```

TABLE 5

```
<resource uri="/wlan/{id}" method="GET,POST,PUT,DELETE"
mediaType="JSOV">
  <path-parameter name="id" mapTo="wlanConfig.id"/>
  <property name="name" vatidato="Size(1,10)"
  mapTo="WlanConfig.name"/>
  <property name="zoneId" validator="NotNull"
  mapTo="WlanConfig.zoneId"/>
  <property name="ipMode" validator="NotNull"
  mapTo="WlanConfig.ipMode"/>
</resource>
<processor type="script">
  <script>
    <![CDATA[
      function(wlan){...}
    ]]>
  </script>
</processor>
<persistence>
  <object ref="DAO.WlanConfig"/>
</persistence>
```

TABLE 6

```
message WlanConfig {
  option (com.company.controller.protobuf.storage.category) = CONFIG;
  required string id = 1 [(com.company.controller.protobuf.storage.id) =
  true];
  optional string name = 2;
  optional string zoneId = 3;
  optional string ipMode = 4;
}
```

TABLE 7

```
message CcmWlan {
  optional string id = 1;
  optional string name = 2;
  optional string zone_id = 4;
  optional CcmCommon common = 5;
}
```

TABLE 7-continued

```
message CcmCommon {
  enum IpMode {
    NONE = 0;
    IPV4 = 1;
    IPV6 = 2;
    IPV4_IPV6 = 3;
  }
  optional IpMode ip_mode = 19;
}
<persistence>
  <object ref="DAO.WlanConfig"/>
</persistence>
<mapper>
  <object from="WlanConfig" to="CcmWlan" byDefault="true">
    <pre-processing>replace 'DUAL' by 'IPV4_IPV6'</pre-processing>
    <field from="ipMode" to="common.ip_mode"/>
  </object>
</mapper>
```

In some embodiments, the presentation layer may: generate a web page with a user interface based at least in part on the user-interface metadata; and communicate with a server via the API. Moreover, a logic layer may: generate an endpoint based at least in part on the API metadata, perform the logic; and translate data to the persistent layer. Furthermore, the persistence layer may leverage the storage API to: save the data based at least in part on the metadata; and provide CRUD, query, and aggregation capabilities. Additionally, a configuration module may retrieve the configuration from the persistence layer, and may generate the common configuration for subsystems based at least in part on configuration metadata.

The data-drive architecture may allow an engineer to adjust system behavior or create a new feature by editing one or more of the metadata files. Moreover, if metadata can be added and patched to the system at runtime, a feature may be pluggable. Note that some features may not be driven by data. For example, significant complexity may force the design of another programming language, which may require the creation of a complier for metadata.

However, in addition to a data-drive architecture, features may be made pluggable using techniques, such as: a service provider interface (such as Java Database Connection driver or a JavaScript engine), and/or a script interpreter. For example, an event reader may be made pluggable. Table 8 illustrates a service provider interface for a new command (an event processor). Moreover, Table 9 provides a pluggable implementation of the service provider interface that can be used as an API caller to communicate with a controller. This service provider interface may define a universal interface that specifies how to process an event or to implement the feature. Table 10 provides metadata for a new event registration and processing flow in a server-less architecture. The service provider interface may be provided by an event reader. A feature team may implement the service provider interface and may provide metadata for a new event. Once the event reader can load the binary code and metadata at runtime, the feature may be pluggable. In this way, a customer may be able to get the latest feature using feature pluggability without upgrading the entire controller.

TABLE 8

```
public interface Command {
  boolean execute(Context context);
}
```

TABLE 9

```
public class SpecificCommand implements Command {
  public boolean execute(Context context) {
    Event e =
      (Event)context.get(EventHandler.EVENT_ENTITY_KEY);
    // call API provided by platform for the event processing
    storeEvent(e);
    sendEventToNorthbound(e);
    notify Stakebolders(e);
  }
}
```

TABLE 10

```
<bean id="specificCommand"
  class="com.company.sz.event.command.SpecificCommand"/>
<bean name="event-9999" ref="specificCommand"/>
```

In some embodiments of the configuration techniques, a plugin or module fix a feature is implemented using a container. Moreover, in some embodiments providing a feature plugin or module may including delivering a Docker image.

In the present discussion, a 'container' may be a standard unit of software that packages up code and its dependencies, so an application (e.g., a feature) runs quickly and reliably from one computing environment to another. Thus, containerized software may always run the same, regardless of the infrastructure. Stated differently, containers may isolate software from its environment and may ensure that it works uniformly despite differences, e.g., between development and staging.

For example, a Docker container image (from Docker, Inc. of Palo Alto, California) is a lightweight, standalone, executable package of software that includes every thing needed to run an application, including: code, runtime, system tools, system libraries and settings. Note that container images may become containers at runtime. In the case of a Docker container, an image may become a container when it runs on a Docker Engine.

Note that the use of containers for features may decouple the development lifecycle for a platform and the feature. These capabilities may make the features pluggable and modular. Moreover, the use of containers may limit data migration to the feature level instead of the platform level. As discussed previously, this may allow the release of a feature without requiring a platform upgrade.

Consequently, the configuration techniques may allow a feature to be released for multiple products (instead of requiring a separate image for each product model) and may be pushed to the products. This may eliminate the need for a customer to download an image from a support website and then perform an upgrade flow. Moreover, the feature release data may not need to be aligned with the platform or product release schedule. Because customers often test platform releases for several months or more, this decoupling may allow more rapid availability of features in the field. Furthermore, customers may be able to benefit from cloud-based services associated with a feature without requiring a platform upgrade.

In some embodiments of the configuration techniques, there may be three ways to a delivery a feature: a feature may be delivered as a plugin; a feature may be delivered using a Docker image; and/or a feature may be delivered using a controller image. In this architecture, the controller platform may have or may include several layers: software as a service, platform as a service, and infrastructure as a service. In each of these layers, the controller functionality may be implemented as microservices. Moreover, the microservices may be containerized, so that a feature may be added as a plugin (or as a code injection) in a given microservice. In some embodiments, the configuration techniques may use: data-driven programming, a service provider interface, a domain specific language, and/or interpreted language (such as JavaScript) to provide the feature-pluggability capability in a given microservice.

These capabilities may allow microservices to be delivered and deployed in a cloud-based system, so that a local implementation may be transferred to the cloud using the same code base. Moreover, in some embodiments, the configuration techniques may allow different management planes to be implemented in a local or a cloud-based controller using the same code base and with the same outputs.

Figure 6:
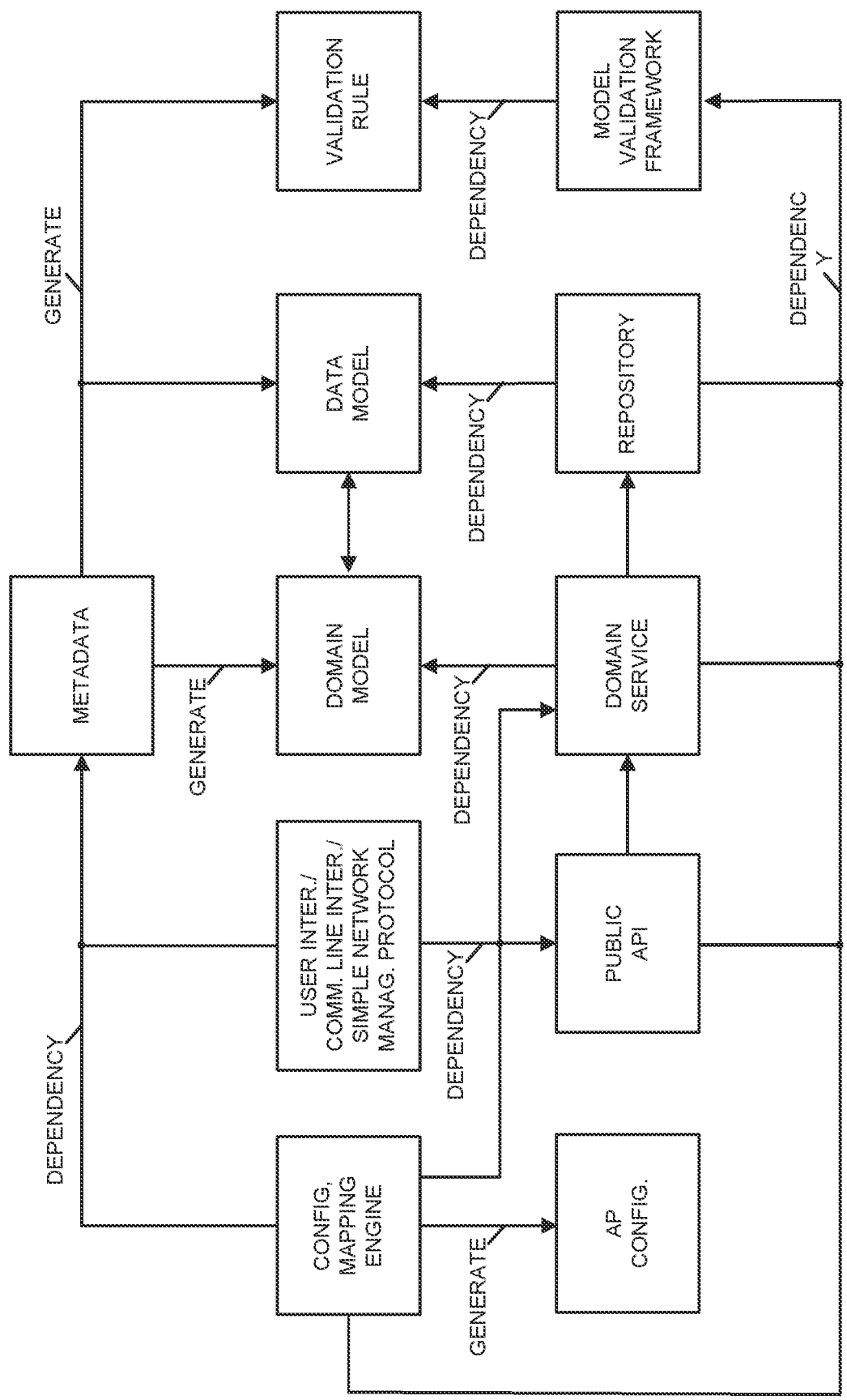
FIG. 6 is a drawing illustrating an example of data dependencies among components in a system in accordance with an embodiment of the present disclosure.
Figure 7:
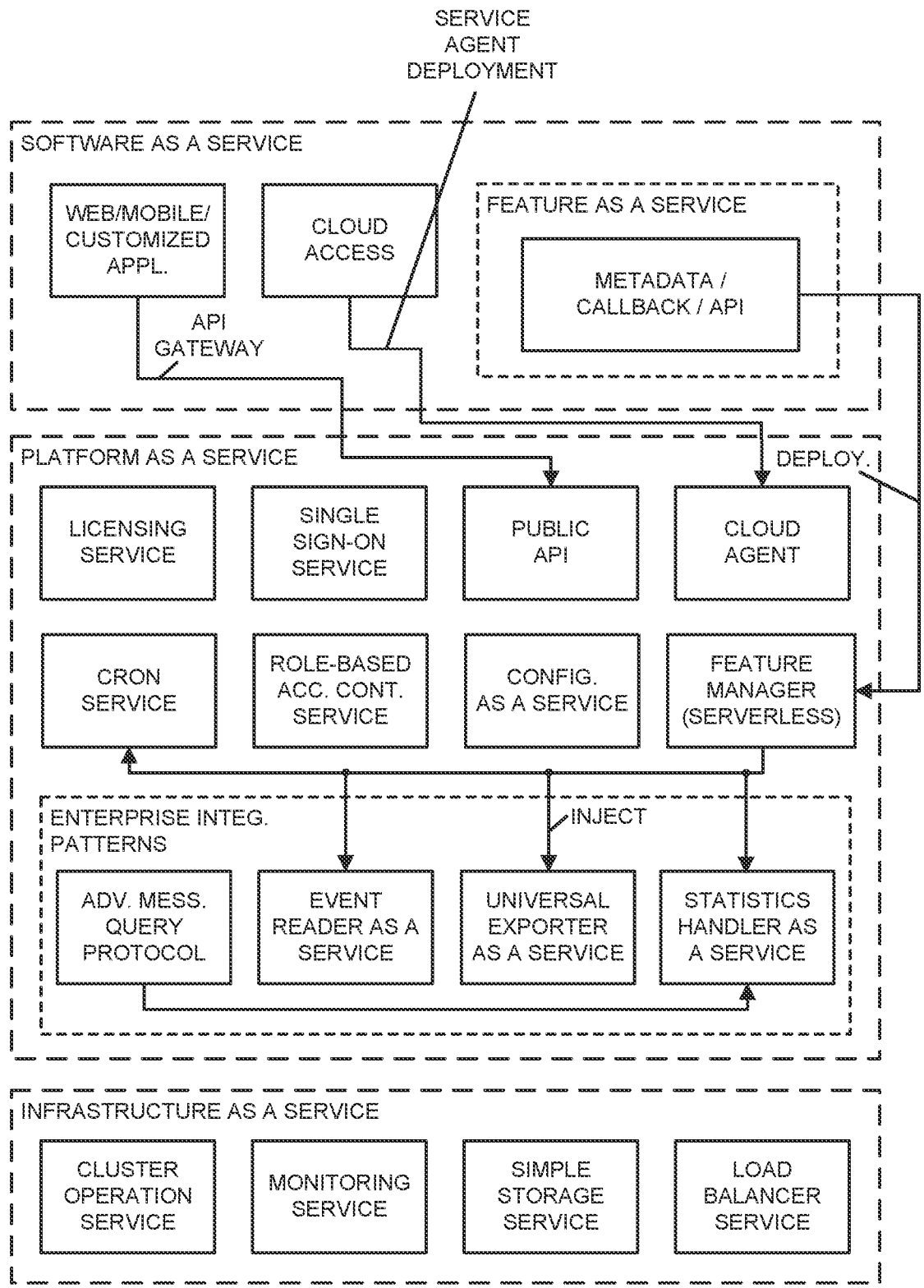
FIG. 7 is a drawing illustrating an example of a software architecture for microservices in accordance with an embodiment of the present disclosure.

FIG. 6 presents a drawing illustrating an example of data dependencies among components in a system in accordance with an embodiment of the present disclosure. Moreover, FIG. 7 presents a drawing illustrating an example of a software architecture for microservices in accordance with an embodiment of the present disclosure.

In summary, a data-driven architecture may provide low code complexity and easier maintainability. Moreover, metadata may be patched at runtime for fast adjustment. Furthermore, a service provider interface and/or a script interpreter may provide feature pluggability and may increase development velocity. With feature pluggability, there may be a shorter release lifecycle, so that customers can get new features quickly.

In some embodiments of the configuration techniques, the storage API may use one or more Protocol Buffers as the data schema. The API at the user or client side and the service side may share the same Protocol Buffer schema file. Through the Protocol Buffer compiler, the client and the server may generate source files of the data structure. Then, the bridge of the data protocol between the client and the server is created.

Note that a Protocol Buffer may specify a format of serialized data, as with JavaScript Object Notation (JSON) or Extensible Markup Language, but with additional characteristics. In the storage API, the Protocol Buffer may describe configurable options that indicate how the data entity in the schema file has been processed by a storage service. See, for example, the message for the representational state transfer (RESTful) API described below.

Other embodiments of the configuration techniques provide an API. Notably, applications often persistent data into a data structure. However, a developer typically needs to handle different data structures or databases based on their capability, reliability and associated client libraries.

In some embodiments, these problems are addressed using a RESTful API. Notably, this API may be used to manipulate data processing based at least in part on Protocol Buffer-based technique to simply the development on persistence layer. Note that RESTful is a software architectural style which uses a subset of Hyper Text Transfer Protocol. In this approach, an application may define its own schema based at least in part on a predefined Protocol Buffer syntax. Moreover, the backend for the API may process data according to the Protocol Buffer specified by the application. For this purpose, the API may define several categories for different combination of data processing, including CRUD, search and/or aggregation. For example, a message may include: SwitchConfig{ option (com.company.controller-.protobuf.storage.category)=CONFIG; //message level required string mac=1 [(com.company.controller.protobuf-.storage.id)=true]; //field level}. Note that the keyword "CONFIG" indicates that the data provides a configuration, and therefore may only needs CRUD operations (i.e., there is no search and aggregation).

This API may offer several benefits. Notably, an application may adopt this general and simple API rather than a native client library provided by a different data structure or database. Moreover, the application may change data type and schema anytime without revising the data structure or the database. Furthermore, the application may leverage the fruitful contribution in this API, such as consistency, availability, performance, search and/or aggregation. Additionally, a developer of the application may focus on business logic and may leave storage to the API. In addition, the API may be easy to understand and adopt, and the application may not need to consider which underlying data structure or database it needs to adopt. This may reduce the time and effort needed to develop the application.

In some embodiments, the RESTful API may include a resource type, which is a string that specifies a resource identifier for a specific resource (such as routers, switches or systems) for read or write. A post command may create specified resources and a delete command may delete specified resources. Moreover, a get command may get a resource, and a put command may update a resource. Furthermore, a post command may query resources based at least in part on a criterion. For example, a query may represent all the switches matching the following criteria: media access control (MAC) address is '00:11:22:33:44:55' or '55:44:33:22:11:00'. This MAC address query may match a switch.

Note that the preceding embodiments of the user interface may include fewer or additional objects or features, a different object or feature, a position of an object or feature may be changed, two or more objects or features may be combined into a single object or feature, information may be included in a different format, and/or an object or feature may be divided into two or more objects or features.

We now describe embodiments of a method in the second group of embodiments. FIG. 8 presents a flow diagram illustrating an example of a method 800 for providing a controller for multiple different types of CNDs using a computer system (such as computer system 104 or controller 108 in FIG. 1). During operation, the computer system may receive, associated with a second computer (such as a second computer associated with a network administrator), metadata (operation 810) associated with the different types of CNDs, where configuration and/or management of a given type of CND uses program modules and is specified by a subset of the metadata associated with a given type of CND, and where a given program module includes a set of instructions. Note that the types of CNDs may include: an access point, a switch, a router, and a dataplane. Moreover, a given program module may be associated with one or more device-specific functions of at least a given type of CND. For example, one or more of a user interface, an API, storage, or a configuration of a given type of CND associated with at least a subset of the program modules are specified by the subset of the metadata associated with the given type of CND.

Then, the computer system provides the controller (operation 812) for the multiple different types of CNDs based at least in part on the program modules and the metadata, where providing the controller includes using a common framework in the computer system for the program modules.

Moreover, the common framework may include a unified protocol layer for the program modules.

In some embodiments, the computer system may optionally perform one or more additional operations (operation 814). Notably, the computer system may modify or configure one or more of the program modules via the unified protocol layer based at least in part on instructions that are compatible with a common communication protocol, such as an HTTPS communication protocol. Furthermore, the computer system may receive, associated with the second computer and via a common access port, the metadata and/or the instructions.

Alternatively or additionally, the computer system may communicate with the different types of CNDs via the unified protocol layer using a second common communication protocol, such as an HTTPS communication protocol. In some embodiments the computer system may communicate with the different types of CNDs via a second common access port.

In some embodiments of method 800, there may be additional or fewer operations. Furthermore, the order of the operations may be changed, and/or two or more operations may be combined into a single operation.

Figure 9:
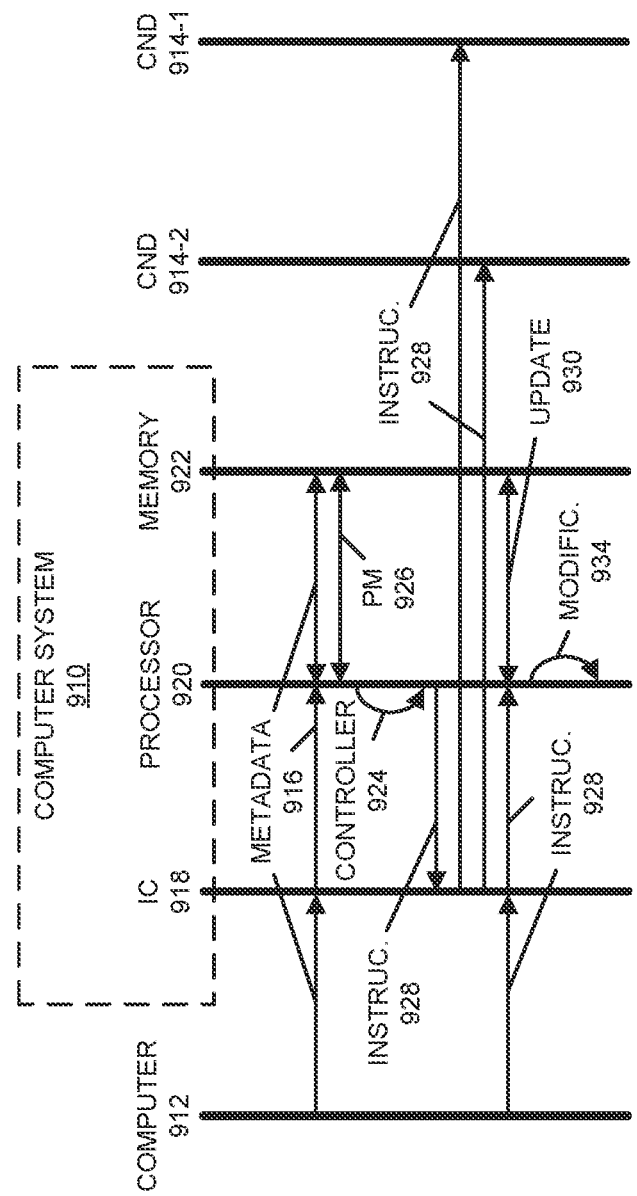
FIG. 9 is a drawing illustrating an example of communication between components in a computer system in FIG. 1 in accordance with an embodiment of the present disclosure.

FIG. 9 presents a drawing illustrating an example of communication between computer system 910, a computer 912 and CNDs 914. Notably, computer 912 may provide metadata 916 to computer system 910, where metadata 916 is associated with CNDs 914 (which include different types of CNDs). Moreover, configuration and/or management of a given type of CND by computer system 910 may use program modules 926 and the configuration and/or management may be specified by a subset of metadata 916 associated with a given type of CND, where a given program module includes a set of instructions. For example, the subset of metadata 916 may be associated with: an API a storage API, storage, and/or configuration code for one of CNDs 914.

After receiving metadata 916, an interface circuit (IC) 918 in computer system 910 may provide metadata 914 to processor 920 in computer system 910. Then, processor 920 may store metadata 914 in memory 922 in computer system 910.

Next, processor 920 may provide a controller 924 for CNDs 914 based at least in part on program modules (PM) 926 (which are stored in memory 922) and metadata 914, where providing controller 924 may include using a common framework in computer system 910 for program modules 924. Notably, controller 924 may provide instructions 928 to CNDs 914 via interface circuit 918, where instructions 928 may configure and/or manage CNDs 914. For example, processor 320 may access, in memory 322, configuration metadata in metadata 916. Furthermore, processor 320 may translate the configuration metadata into configuration code. Additionally, processor 320 may instruct interface circuit 918 to provide the configuration code to one of CNDs 914 (such as CND 914-1).

Note that the common framework may include a unified protocol layer for program modules 926. Consequently, computer 910 may provide one or more instructions 930 to computer system 910 that specifying one or more modifications or configuration changes for one or more of the program modules 926 associated with one or more of CNDs 914 via the unified protocol layer using a common communication protocol, such as an HTTPS communication protocol. For example, instructions 930 may modify or change the subset of metadata 914. Furthermore, interface circuit 918 may receive instructions 930 (and/or metadata 916) via a common access port (such as an access point that receives instructions for the different types of CNDs 914). Then, interface circuit 918 may provide instructions 930 to processor 920. Next, processor 920 may update 932 metadata 914 in memory 922 based at least in part on instructions 930, and processor 920 may modify 934 one or more functions of controller 924 based at least in part on instructions 930.

Alternatively or additionally, processor 920 may communicate with the different types of CNDs 914 via the unified protocol layer using a second common communication protocol for the different types of CNDs 914. Note that the second common communication protocol may be the same as or different from the common communication protocol (such as an HTTPS communication protocol). In some embodiments, computer system 910 may communicate with the different CNDs 914 using a second common access port.

Furthermore, while FIG. 9 illustrates communication between components using unidirectional or bidirectional communication with lines having single arrows or double arrows, in general the communication in a given operation in these figures may involve unidirectional or bidirectional communication.

We now further describe the configuration and/or management techniques. Different types of CNDs (such as access points, routers, switches and dataplanes or a portion of a network the carries or conveys data traffic) typically have different features. Consequently, different controllers are often used to configure and manage different types of CNDs.

The disclosed configuration and/or management techniques provide a cloud-based controller (such as a computer system that implements the controller) for multiple different types of devices using a common framework. This common framework may have a data-driven architecture, so it can be configured for the different functionality of the different types of devices (e.g., using metadata). Thus, while the overall architecture or framework of the controller may be common for the different types of CNDs, a given type of CNDs may use different configuration parameters, settings, and features than other types of CNDs.

Notably, the cloud-based controller may leverage common features or functionality that is reusable across different models of a given type of CND and/or different types of CNDs. This architecture may allow the controller to be more rapidly updated to configure and manage a new model of the given type of CND and/or a new type of CND (such as a software-defined wide area network or SD-WAN, or an edge CND). Thus, the cloud-based controller may provide better scaling, updating and/or deployment.

Figure 10:
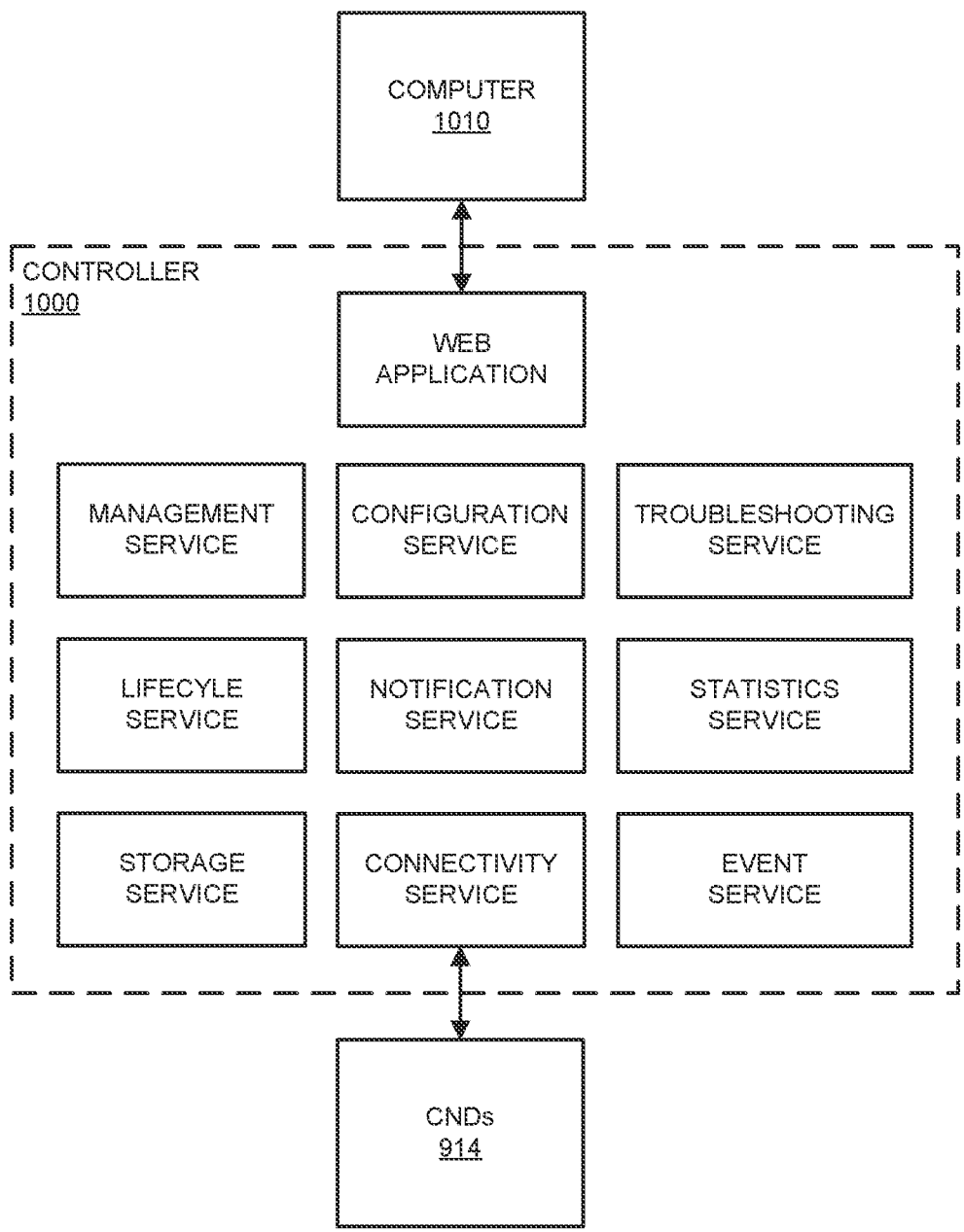
FIG. 10 is a drawing illustrating an architecture of a controller in accordance with an embodiment of the present disclosure.

FIG. 10 presents an architecture of a controller 1000, such as a controller implemented by computer system 104 or controller 108 in FIG. 1. In FIG. 10, universal device management modules (which are sometimes referred to as 'standard program modules') or a common management plane framework' may be used in controller 1000 to provide one cloud-native architecture for multiple different types of CNDs. Thus, in FIG. 10, the various scenarios are common for different types of CNDs and a unified framework is used to configure and manage the different types of CNDs. In addition, controller 1000 may reduce or minimize the difference among the different types of CNDs, so that when a new type of CND is introduced an update to controller 1000 may be developed and implemented more rapidly.

As shown in FIG. 10, the common framework (which is sometimes referred to as a 'common management framework') in controller 1100 may have multiple groups of features or services, including: a management service (that may provide feature settings and license checking), a lifecycle service (that may provide device registration and may issue a JavaScript Object Notation Web Token or JWT for secure identification), a storage service (that may store firmware and/or program modules), a configuration service (which may be data-driven), a notification service (that may provide notification and commands), a connectivity service (that may provide Mutual Transport Layer Security (mTLS) authentication and JWT authorization), a troubleshooting service (that may be assess via a web page via a web application), a statistics service (which may provide a status report or a statistics report), an event service (that provides events or alarms), and/or another type of service. Note that a network administrator may provide metadata or instructions to the controller via a web application. Moreover, note that the controller may communication with different CNDs via a common access port using a common communication protocol (such as an HTTP-based communication protocol, e.g., HTTPS, a Google Remote Procedure Call or GRPC, web socket or an Internet Engineering Task Force standard RFC 6455, etc.).

During operation of controller 1000, a network administration may (via a computer 1010) provide an instruction to management service to pre-provisional CNDs using the web application. In response, the management service may obtain licenses and features states for the CNDs, and may provide this information to the lifecycle service. Then, for a given CND, the connectivity service may perform a join with the given CND and may get approval (which may include checking a manufacturer certificate and providing mutual authentication to the lifecycle service). Moreover, the lifecycle service may very verify the given CND and may issue a token (such as a JWT).

The management service may trigger the configuration service to generate a configuration for the given CND. Because controller 1000 is data-driven (such as using metadata for the given CND, which may have been previously provided by or specified by the network administrator), the configuration service may know how the user configured the given CND, the appropriate feature set, etc. Next, the configuration service send a notification to the given CND via the notification service, which may push the notification to the given CND via the connectivity service.

Furthermore, the given CND may download firmware for the configuration from the storage service. Additionally, the given CND may periodically report statistics and events to the event service and the statistics service.

When a problem or an error occurs with one or more of the CNDs (such as a given one of the CNDs), the network administrator may be alerted by an alarm. In response, the network administrator may use a web console associated with the troubleshooting service to perform on-demand troubleshoot of the problem. In response, the troubleshooting service may notify a given one of the CNDs for remote access via the notification service. Then, the connectivity service may provide a bridge from a user interface of the troubleshooting service to the given one of the CNDs. In this way, an access point (which may be the given one of the CNDs) may have a dedicated connection to the troubleshooting service.

Note that one or more of the services in controller 1000 may be associated with features in a common library. In some embodiments, one or more services in controller 1000 may be used to define access-point features (such as a WLAN name, authentication, etc.) and/or a virtual local area network (VLAN) for a switch. More generally, attributes or configuration of different features and/or services of controller 1000 may be defined or specified (e.g., by the network administrator) using metadata (such as using a metadata file).

Figure 11:
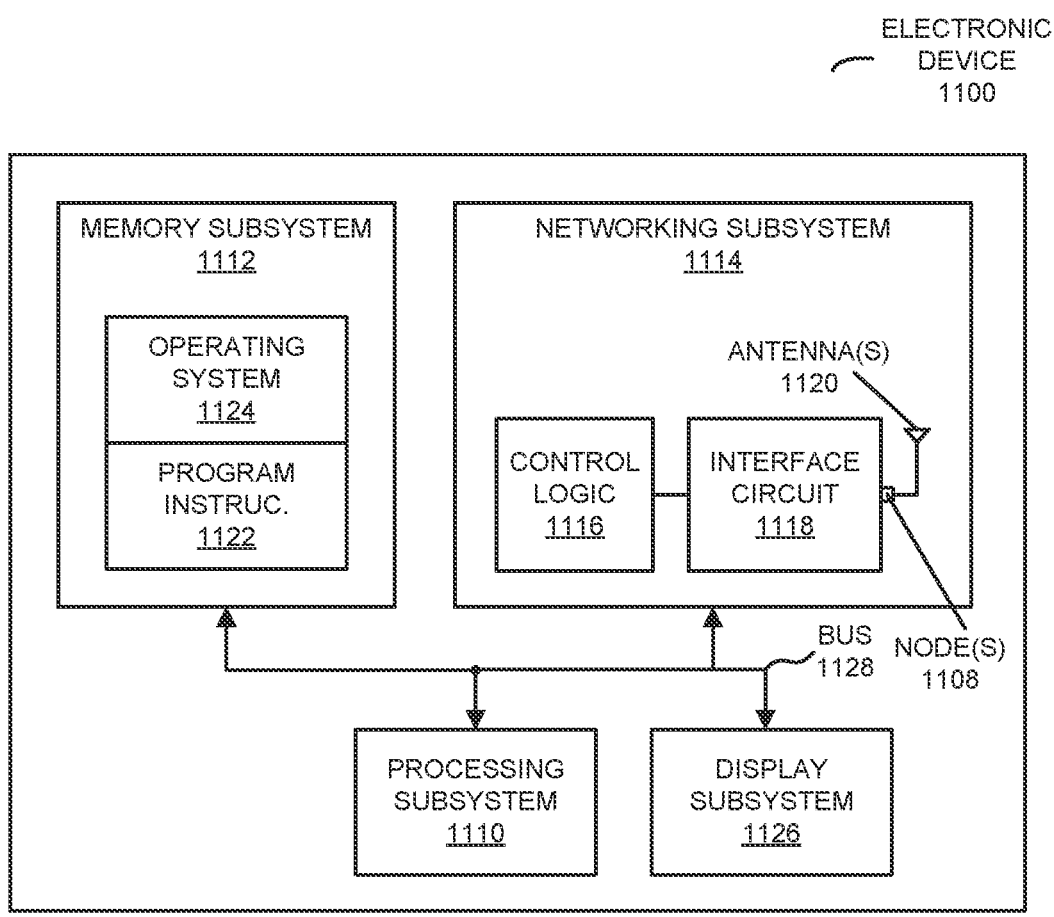
FIG. 11 is a block diagram illustrating an example of an electronic device in accordance with an embodiment of the present disclosure.

We now describe embodiments of an electronic device, which may perform at least some of the operations in the configuration techniques and/or the configuration and/or management techniques. FIG. 11 presents a block diagram illustrating an example of an electronic device 1100 in accordance with some embodiments, such as one of computer system 104, one of CNDs 106, controller 108, one of APs 110 or one of electronic devices 112. This electronic device includes processing subsystem 1110, memory subsystem 1112, and networking subsystem 1114. Processing subsystem 1110 includes one or more devices configured to perform computational operations. For example, processing subsystem 1110 can include one or more microprocessors, ASICs, microcontrollers, programmable-logic devices, one or more graphics process units (GPUs) and/or one or more digital signal processors (DSPs).

Memory subsystem 1112 includes one or more devices for storing data and/or instructions for processing subsystem 1110 and networking subsystem 1114. For example, memory subsystem 1112 can include dynamic random access memory (DRAM), static random access memory (SRAM), and/or other types of memory. In some embodiments, instructions for processing subsystem 1110 in memory subsystem 1112 include: one or more program modules or sets of instructions (such as program instructions 1122 or operating system 1124), which may be executed by processing subsystem 1110. Note that the one or more computer programs may constitute a computer-program mechanism. Moreover, instructions in the various modules in memory subsystem 1112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1110.

In addition, memory subsystem 1112 can include mechanisms for controlling access to the memory. In some embodiments, memory subsystem 1112 includes a memory hierarchy that comprises one or more caches coupled to a memory in electronic device 1100. In some of these embodiments, one or more of the caches is located in processing subsystem 1110.

In some embodiments, memory subsystem 1112 is coupled to one or more high-capacity mass-storage devices (not shown). For example, memory subsystem 1112 can be coupled to a magnetic or optical drive, a solid-state drive, or another type of mass-storage device. In these embodiments, memory subsystem 1112 can be used by electronic device 1100 as fast-access storage for often-used data, while the mass-storage device is used to store less frequently used data.

Networking subsystem 1114 includes one or more devices configured to couple to and communicate on a wired and/or wireless network (i.e., to perform network operations), including: control logic 1116, an interface circuit 1118 and one or more antennas 1120 (or antenna elements). (While FIG. 11 includes one or more antennas 1120, in some embodiments electronic device 1100 includes one or more nodes, such as nodes 1108, e.g., a network node that can be coupled or connected to a network or link, or an antenna node, connector or a metal pad that can be coupled to the one or more antennas 1120. Thus, electronic device 1100 may or may not include the one or more antennas 1120) For example, networking subsystem 1114 can include a Bluetooth™ networking system, a BLE networking system, a Zigbee networking system, a Loran network system, a cellular networking system (e.g., a 3G/4G/5G network such as UMTS, LIE, etc.), a universal serial bus (USB) networking system, a networking system based on the standards described in IEEE 802.11 (e.g., a Wi-Fi® networking system), an Ethernet networking system, a cable modem networking system, and/or another networking system.

Note that a transmit or receive antenna pattern (or antenna radiation pattern) of electronic device 1100 may be adapted or changed using pattern shapers (such as reflectors) in one or more antennas 1120 (or antenna elements), which can be independently and selectively electrically coupled to ground to steer the transmit antenna pattern in different directions. Thus, if one or more antennas 1120 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 1100 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 1114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1100 may use the mechanisms in networking subsystem 1114 for performing simple wireless communication between the electronic devices, e.g., transmitting advertising or beacon frames and/or scanning for advertising frames transmitted by other electronic devices as described previously.

Within electronic device 1100, processing subsystem 1110, memory subsystem 1112, and networking subsystem 1114 are coupled together using bus 1128. Bus 1128 may include an electrical, optical, and/or electro-optical connection that the subsystems can use to communicate commands and data among one another. Although only one bus 1128 is shown for clarity, different embodiments can include a different number or configuration of electrical, optical, and/or electro-optical connections among the subsystems.

In some embodiments, electronic device 1100 includes a display subsystem 1126 for displaying information on a display, which may include a display driver and the display, such as a liquid-crystal display, a multi-touch touchscreen, etc.

Electronic device 1100 can be (or can be included in) any electronic device with at least one network interface. For example, electronic device 1100 can be (or can be included in): a desktop computer, a laptop computer, a subnotebook/netbook, a server, a tablet computer, a smartphone, a cellular telephone, a smartwatch, a consumer-electronic device, a portable computing device, an AP, a transceiver, a router, a switch, communication equipment, a CND, a stack of multiple CNDs, controller, test equipment, an IoT device, and/or another electronic device.

Although specific components are used to describe electronic device 1100, in alternative embodiments, different components and/or subsystems may be present in electronic device 1100. For example, electronic device 1100 may include one or more additional processing subsystems, memory subsystems, networking subsystems, and/or display subsystems. Additionally, one or more of the subsystems may not be present in electronic device 1100. Moreover, in some embodiments, electronic device 1100 may include one or more additional subsystems that are not shown in FIG. 11. Also, although separate subsystems are shown in FIG. 11, in some embodiments some or all of a given subsystem or component can be integrated into one or more of the other subsystems or component(s) in electronic device 1100. For example, in some embodiments program instructions 1122 are included in operating system 1124 and/or control logic 1116 is included in interface circuit 1118.

Moreover, the circuits and components in electronic device 1100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of electronic device 1100 and/or networking subsystem 1114. The integrated circuit may include hardware and/or software mechanisms that are used for transmitting wireless signals from electronic device 1100 and receiving signals at electronic device 1100 from other electronic devices. Aside from the mechanisms herein described, radios are generally known in the art and hence are not described in detail. In general, networking subsystem 1114 and/or the integrated circuit can include any number of radios. Note that the radios in multiple-radio embodiments function in a similar way to the described single-radio embodiments.

In some embodiments, networking subsystem 1114 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wired and/or wireless communication techniques may be used. Thus, the configuration techniques and/or the configuration and/or management techniques may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the configuration techniques and/or the configuration and/or management techniques may be implemented using program instructions 1122, operating system 1124 (such as a driver for interface circuit 1118) or in firmware in interface circuit 1118. Alternatively or additionally, at least some of the operations in the configuration techniques and/or the configuration and/or management techniques may be implemented in a physical layer, such as hardware in interface circuit 1118.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the configuration techniques and/or the configuration and/or management techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
   an interface circuit;
   a memory configured to store program modules and metadata associated with different types of computer network devices (CNDs), wherein each of the program modules comprises a set of instructions; and
   a processor coupled to the interface circuit and the memory, wherein the processor is configured to execute the program modules, and wherein, when executed by the processor, the program modules cause the computer system to perform operations comprising:
      providing a controller for multiple different types of CNDs based at least in part on the program modules and the metadata, wherein the providing comprises using a common framework in the computer system for the program modules,
      wherein configuration and management of a given type of CND using the program modules is specified by a subset of the metadata associated with the given type of CND,
      wherein the common framework comprises a unified protocol layer for the program modules,
      wherein the operations comprise communicating with the different types of CNDs via the unified protocol layer using a common communication protocol, which is compatible with a HyperText Transfer Protocol Secure (HTTPS) communication protocol,
      wherein the controller configures and manages the different types of CNDs,
      wherein the memory stores a first data structure and a second data structure, and the operations comprise using common query responsibility segregation (CQRS) for streaming data and microservices, and seamless data synchronization based at least in part on the first data structure and the second data structure; and
      wherein, for data reported by the given type of CND, the CQRS comprises storing the data to the first data structure, and, for a command associated with a configuration of the given type of CND, the CQRS comprises storing the data to the second data structure and synchronizing the second data structure with the first data structure.

2. The computer system of claim 1, wherein the types of CNDs comprise: an access point, a switch, a router, and a dataplane.

3. The computer system of claim 1, wherein the communicating with the different types of CNDs occurs via a common access port.

4. The computer system of claim 1, wherein a given program module is associated with one or more device-specific functions of at least the given type of CND.

5. The computer system of claim 1, wherein one or more of a user interface, an application programming interface (API), storage, or a configuration of the given type of CND associated with at least a subset of the program modules are specified by the subset of the metadata associated with the given type of CND.

6. A non-transitory computer-readable storage medium for use in conjunction with a computer system, the computer-readable storage medium storing program modules, wherein each of the program modules comprises a set of instructions, and wherein, when executed by the computer system, the program modules cause the computer system to perform operations comprising:

receiving, associated with a second computer, metadata associated with different types of computer network devices (CNDs), wherein configuration and management of a given type of CND using the program modules is specified by a subset of the metadata associated with the given type of CND; and providing a controller for the multiple different types of CNDs based at least in part on the program modules and the metadata, wherein providing the controller comprises using a common framework in the computer system for the program modules, wherein the common framework comprises a unified protocol layer for the program modules, wherein the operations comprise communicating with the different types of CNDs via the unified protocol layer using a common communication protocol, which is compatible with a HyperText Transfer Protocol Secure (HTTPS) communication protocol, wherein the controller configures and manages the different types of CNDs, wherein the computer-readable storage medium stores a first data structure and a second data structure, and the operations comprise using common query responsibility segregation (CQRS) for streaming data and microservices, and seamless data synchronization based at least in part on the first data structure and the second data structure; and wherein, for data reported by the given type of CND, the operations comprises storing, using the CQRS, the data to the first data structure, and, for a command associated with a configuration of the given type of CND, the operations comprises storing, using the CQRS, the data to the second data structure and synchronizing, using the CQRS, the second data structure with the first data structure.

7. The non-transitory computer-readable storage medium of claim 6, wherein the types of CNDs comprise: an access point, a switch, a router, and a dataplane.

8. The non-transitory computer-readable storage medium of claim 7, wherein the communicating with the different types of CNDs occurs via a common access port.

9. The non-transitory computer-readable storage medium of claim 6, wherein a given program module is associated with one or more device-specific functions of at least the given type of CND.

10. A method for providing a controller for multiple different types of computer network devices (CNDs), comprising:

by a computer system:

receiving, associated with a second computer, metadata associated with the different types of CNDs, wherein configuration and management of a given type of CND uses program modules and is specified by a subset of the metadata associated with the given type of CND, and wherein each of the program modules comprises a set of instructions; and providing the controller for the multiple different types of CNDs based at least in part on the program modules and the metadata, wherein providing the controller comprises using a common framework in the computer system for the program modules, wherein the common framework comprises a unified protocol layer for the program modules, wherein the operations comprise communicating with the different types of CNDs via the unified protocol layer using a common communication protocol, which is compatible with a HyperText Transfer Protocol Secure (HTTPS) communication protocol, wherein the controller configures and manages the different types of CNDs, wherein the computer system stores a first data structure and a second data structure, and the method comprises using common query responsibility segregation (CQRS) for streaming data and microservices, and seamless data synchronization based at least in part on the first data structure and the second data structure; and wherein, for data reported by the given type of CND, the method comprises storing, using the CQRS, the data to the first data structure, and, for a command associated with a configuration of the given type of CND, the method comprises storing, using the CQRS, the data to the second data structure and synchronizing, using the CQRS, the second data structure with the first data structure.

11. The method of claim 10, wherein the types of CNDs comprise: an access point, a switch, a router, and a dataplane.

12. The method of claim 11, wherein the communicating with the different types of CNDs occurs via a common access port.

13. The method of claim 10, wherein a given program module is associated with one or more device-specific functions of at least the given type of CND.

14. The method of claim 10, wherein one or more of a user interface, an application programming interface (API), storage, or a configuration of the given type of CND associated with at least a subset of the program modules are specified by the subset of the metadata associated with the given type of CND.

* * * * *